United States Patent [19]

McNesby et al.

[11] Patent Number: 4,538,286
[45] Date of Patent: Aug. 27, 1985

[54] DATA RATE CONVERSION AND SUPERVISORY BIT INSERTION IN A DATA SYSTEM

[75] Inventors: John B. McNesby, Mesa, Ariz.; Joseph F. Krys, Denver, Colo.

[73] Assignee: GTE Communications Products Corporation, Stamford, Conn.

[21] Appl. No.: 517,309

[22] Filed: Jul. 26, 1983

[51] Int. Cl.³ .............................................. H04J 3/06
[52] U.S. Cl. ..................................... 375/112; 370/84; 370/102
[58] Field of Search ................. 375/112, 122; 370/79, 370/84, 102; 381/30, 31, 32, 34, 35

[56] References Cited

U.S. PATENT DOCUMENTS

| | | | |
|---|---|---|---|
| 4,025,720 | 5/1977 | Pachynski, Jr. | 370/102 |
| 4,045,613 | 8/1977 | Walker | 375/112 |
| 4,053,715 | 10/1977 | Drapkin | 370/102 |
| 4,058,683 | 11/1977 | Fenoglio | 370/102 |

Primary Examiner—Robert L. Griffin
Assistant Examiner—Stephen Chin
Attorney, Agent, or Firm—Douglas M. Gilbert; John A. Odozynski; Russell A. Cannon

[57] ABSTRACT

A data rate converter for use in telecommunications inserts supervisory bits into a data stream to increase the data rate, in one application, from 56 kbps to a standard 64 kbps. A standard 64 kbps PCM telephone channel uses 8-bit words for transmission, whereas 56 kbps occupies only 7 bits of an 8 bit word in such a telephone channel. Supervisory bits are inserted at the exact time when the data channel clock signal and the transmission line clock signal are in phase alignment.

6 Claims, 3 Drawing Figures

DATA RATE CONVERSION AND SUPERVISORY BIT INSERTION IN A DATA SYSTEM

BACKGROUND OF THE INVENTION

In the field of telecommunications the adopted standard for digital transmission in the United States is an 8-bit word or byte per sample at a Nyquist sampling rate of 8 kHz, so that a standard digital voice channel has a line transmission rate of 64 kbps (thousand bits per second). The commonly established data transmission rates are 2.4, 4.8, 9.6, 19.2 and 56 kbps. For effective transmission of the subscriber data or voice over a standard digital voice transmission channel, the subscriber data will be packed in an available 7 bits per byte as required by the data rate.

This invention relates to digital data or voice transmission between a subscriber and a telephone central office and, more particularly, to the insertion of supervisory bits in the least significant bit position of an 8 bit PCM encoded word, and the synchronization of the transmitted data to conform to the 64 kbps rate of a standard digital voice transmission channel.

The insertion of winking framing bits into a serial binary pulse train is well-known. Pulse stuffing techniques are also used to add noninformation (sometimes called "dummy") pulses to a pulse train to compensate for the difference between write and read rates where a plurality of lower rate pulse trains are to be multiplexed and transmitted at a higher line rate. Such digital multiplexing techniques are described in the text "Transmission Systems For Communications", Bell Telephone Laboratories, Revised Fourth Edition, 1971, pages 608–625 and is incorporated herein by reference. As explained in the referenced text, and most commonly used, pulse stuffing requires the use of elastic stores and a line rate that is greater than the sum of the rates of the pulse trains to be multiplexed. Further, techniques are required by which the near empty state of the elastic store is identified so that a control signal may be transmitted prior to the time at which the store would be empty, which control signal would notify the distant terminal that in the next frame a stuffed pulse would be transmitted in a pre-determined time slot. This allows the distant terminal to identify the bit location of the stuffed pulse and also allows the elastic store to be replenished.

SUMMARY OF THE INVENTION

Briefly, a serial binary data stream, having a bit rate less than the line transmission rate, is converted into a pulse train of N bit words (bytes per sample) at a sampling rate S to give a line transmission rate NS (bits per second). The number of data bits per word is an integral number I less than N. In order to make the conversion and to also include the necessary supervisory bits in the pulse train, the binary data stream is interrupted when the leading edge of the associated data clock and the leading edge of the associated transmission clock are coincident, and the last data bit is held. During the interruption, I supervisory bits are inserted into the pulse train following which the held data bit is transmitted. Because of the timing, the next data bit will be present to be written into the pulse train by the data clock.

DETAILED DESCRIPTION OF THE INVENTION

Figure 1:
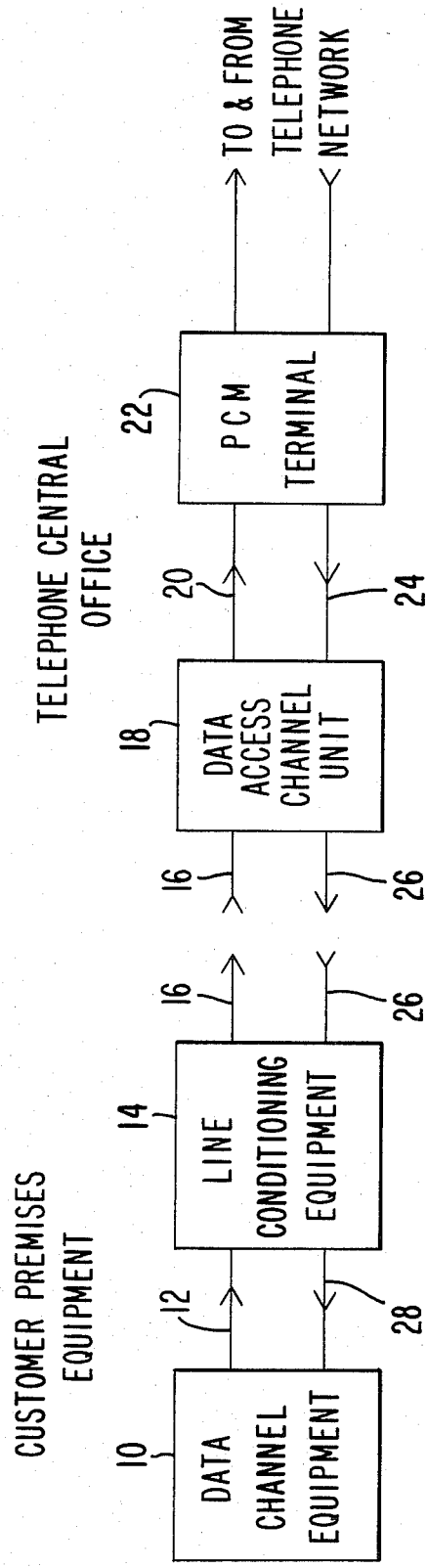
FIG. 1 is a block diagram illustrating one environment in which the invention may be employed.

Referring now to FIG. 1, data channel equipment 10 represents a source of serial binary data, such as from a computer, a FAX machine, or a line printer. It should be understood that the transmission of subscriber data from such a data source, must be conditioned to interface appropriately with the digital telephone network. For the data to interface with the channel requirements of a PCM terminal, such as shown at 22, a 64 kbps serial bipolar pulse train composed of 8-bit words is necessary. This is true whether or not the data is transmitted via fixed point to point or switched data service. The least significant bit (LSB), i.e., the 8th bit of each word is not used for the transmission of data, because this least significant bit of every 6th frame is used for signalling and framing purposes. While such use between a pair of terminals would not adversely effect every least significant bit of each byte, it should be understood that when one PCM channel is connected to another PCM channel via a digital switch, the second channel would not necessarily choose the same 6th and 12th words as were chosen for the signalling and framing bits of the first span line. Thus each successive stage of a tandem switching system may corrupt additional PCM words and in the worst case, it is possible that the 8th or least significant bit of each byte could be corrupted. For this reason, the 8th bit is not used to carry information in a data mode of operation.

The data from the data channel equipment 10 is applied via path 12 to line conditioning equipment 14 which insures that the data is changed if necessary to a serial bipolar, return-to-zero (RZ) format including 8 bit words, with each bit of equal length. The data occupies no more than 7 bits of an 8-bit word with the 8th bit being the signalling, control or framing bit position (time slot) information or simply a dummy bit. This is accomplished prior to the time the pulse train is examined and modified to prevent the transmission of long strings of zeros, i.e., prior to a zero code generation. The resulting 64 kbps serial bipolar data stream is transmitted along path 16 to a data access channel unit 18 where the signal is further conditioned to interface with the PCM channel of a PCM terminal such as shown at 22.

In the return direction the serial data from the PCM terminal would be transferred to the input of data access channel unit 18 via path 24 where it is conditioned for transmission via path 26 to the input of line conditioning equipment 14 and thence via path 28 to the receiving or sink portion of data channel equipment 10. Of primary concern here is the forming of 8-bit words which consist of 7 data bits and the insertion in the 8th time slot, (i.e. in the least significant bit position) of a signalling, control, framing, or dummy bit (hereinafter generally referred to as a supervisory bit).

Because of the standards established for a PCM channel a 64 kbps line rate for the transmission of information using a 50% bipolar, return-to-zero (RZN) format has been established as the standard for the transmission in the digital network of the United States. Because of potential corruption of the least significant bit as outlined hereinabove only 7 bits of the byte are available for the transmission of data. Hence the maximum transmission rate for the data has been established at 56 kbps. Since this corruption occurs after the pulse train has been introduced into the PCM terminal equipment, the 8th bit is used between the customer premises and the telephone central office for signalling (S), control (U), or framing (F), i.e., the 8th bit provides supervisory functions between the customer premises and the telephone central office. Framing bits are only used for synchronization between the data channel equipment 10 and the data access channel unit 18. Part of the PCM conditioning is to substitute (S) signalling bits for (F) framing bits for PCM transmission. Further lower speed data signals are conditioned by the data grouping circuit 30, in FIG. 2, so as to produce replicated 7 bit words at 56 kbps. Lower speed data is formed into 56 kbps 7 bit words by repetition of a bit stuffed lower speed data word-a well known approach. It is of little importance here as it is unrecognized by the supervisory insertion circuit to be lower speed data. The circuit here described operates in the same manner, whether it is 56 kbps data or a lower rate. This circuit only sees 7 bit words at a 56 kbps timing.

Figure 2:
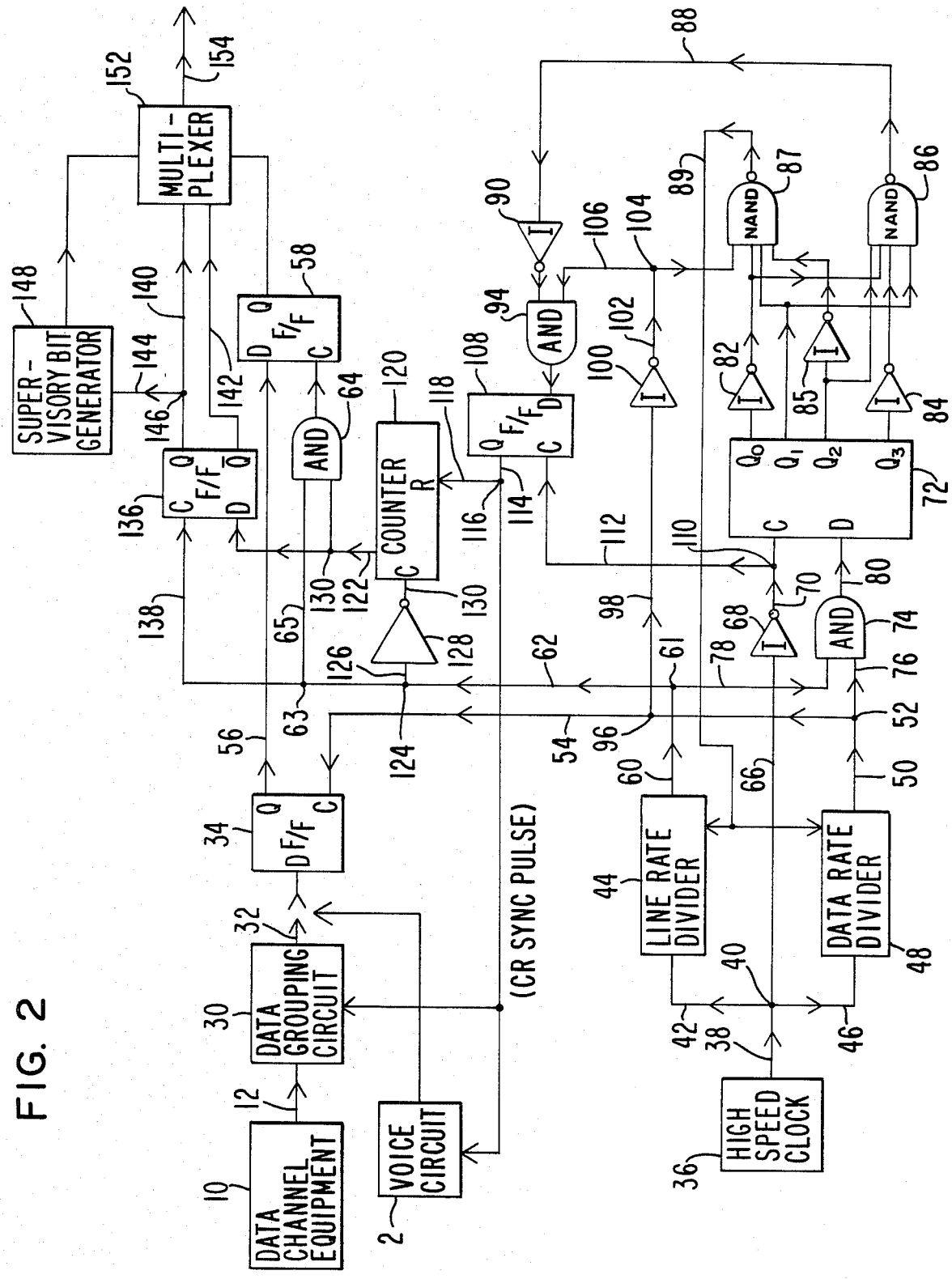
FIG. 2 is a block diagram which shows in more detail the elements of the invention referred to in FIG. 1 as Line Conditioning Equipment.

Referring now to FIG. 2 it may be seen that 0 to 56 kbps data from the data channel equipment 10 is applied via path 12 to the data grouping circuit 30 where the data rate is increased to approximately 56 kbps. The data grouping circuit 30 is required only for data sources having data rates less than 56 kbps. A 56 kbps data source would not require data grouping circuit 30 so that path 12 would be applied directly to the D input of flip-flop 34. Similarly an encoded voice circuit 2 having a 7 bit PCM word format could also be applied in place of a 56 kbps data source. An encoded voice signal would also not require a data grouping circuit since the data rate would be the appropriate 56 kbps.

The 56 kbps is applied to the D input of retiming flip-flop 34. The clock input (C) to flip-flop 34 is derived from high speed clock 36. High speed clock 36 operates at a rate which is a multiple of the line rate, i.e., 64 kHz and a multiple of the data rate, i.e., 56 kHz. In a preferred embodiment the high speed clock operates at 896 kHz and the clock output is applied via path 38, junction 40, and path 46 to the input of data rate divider 48. Divider 48 divides the high speed clock signal (896) kHz by 16 to obtain a 56 kbps clock output on path 50 which is applied via junction 52 and path 54 to the clock input of the retiming flip-flop 34. The serial data is then applied from the Q output of flip-flop 34 via path 56 to the D input of flip-flop 58, which flip-flop is timed via its clock input normally at the 64 kbps rate.

The 64 kbps timing signal is derived from the high speed clock 36 via output path 38, junction 40 and input path 42 to line rate divider 44 and thence via path 60, junction 61 and path 62, junction 63 and path 65 to one input of AND-gate 64. The 64 kbps clock signal will be applied directly to the clock input of flip-flop 58 so long as AND-gate 64 is enabled. However it is clear that because of the difference between the 56 kbps data rate and the 64 kbps line transmission rate, the line timing signal could cause a data signal bit to be read twice absence some form of interruption or change. Blanking the line rate clock pulse at 58 that occurs when the line and data rate clock signals exhibit leading edge phase alignment prevents this from happening. In the 125 microsecond duration of an 8 bit byte, there are seven-56 kbps clock pulses and eight-64 kbps clock pulses. It was discovered that if the supervisory bits were inserted and the accompanying data rate conversion were to occur when the 64 kbps and 56 kbps clock signals exhibited leading edge phase alignment, the possibility of dropping or repeating bits during the serial bit addition was eliminated. Thus it was necessary to derive a timing control signal which would identify the point in time at which the leading edge of the 64 and 56 kbps clock signals were coincident and to use this control timing signal to interrupt the transmission of data to the transmission line and insert a supervisory bit.

Figure 3:
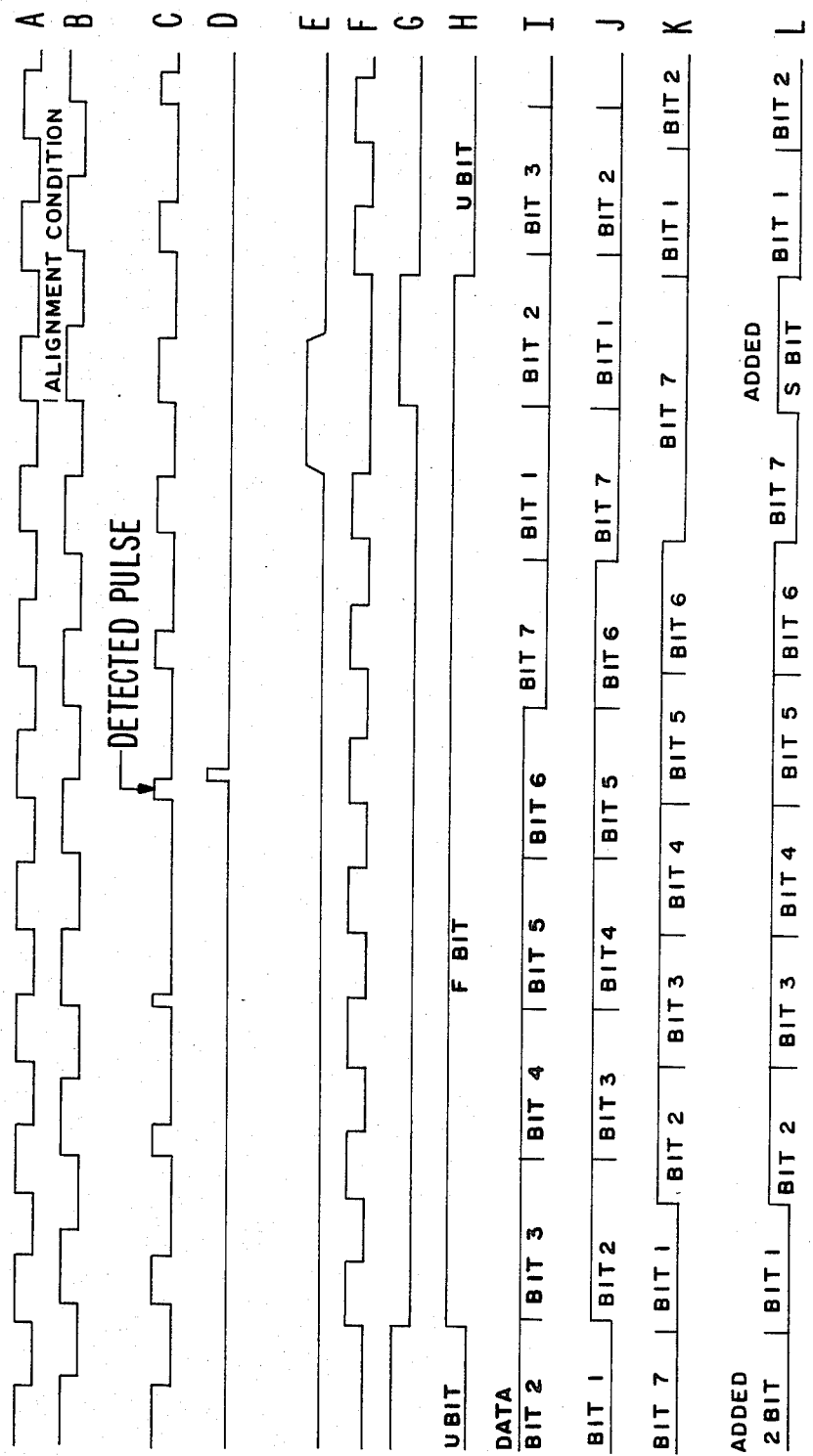
FIG. 3 is a waveform diagram which illustrates the events and their time of occurrence for a particular data rate and line transmission rate.

The manner in which this was accomplished by a preferred embodiment of the invention is described as follows referring now to FIGS. 2 and 3. The clock pulses from the 56 and 64 kbps clocks from data rate divider 48 and line rate divider 44, respectively, are applied as the inputs to AND-gate 74 via paths 76 and 78. The 64 kbps clock pulse is illustrated at waveform A, FIG. 3, and the 56 kbps clock pulse waveform is shown at B in FIG. 3. The output of AND-gate 74, appears on path 80 and is shown at C in FIG. 3, is a periodic train of 8 unique length pulses (including the 0 length glitch that can result from skewing). These 8 unique pulses are applied to the D input of shift register 72. The output of the high speed clock 36 is applied via path 38, junction 40 and path 46 to the input of inverter 68 and the output is applied via path 70 to the clock input of register 72. The unique pulses from the AND-gate 74 are then clocked through the shift register 72. By the use of combinational logic provided by inverters 82 and 84 and NAND-gate 86 the time duration (2.24 microseconds) of the chosen pulse of C is detected. The time of occurrence of the chosen pulse is used as a reference point from which the time of occurrence of phase alignment of the line and data rate clocks can be established. Any pulse in the train of unique pulses could be used with appropriate delays to signal the time when the 56 kbps and 64 kbps clocks have leading edge alignment. The combination logic picks the one we chose. This is to say you cannot just detect a pulse that is two 896 kHz clock periods long, but you must determine whether it was derived from 56 and 64 kbps clocks observing leading or trailing edge alignment. The unique two 896 kHz clock period long pulse occurs at different instances in time in relation to 56 and 64 edge alignments depending on derivation by leading or trailing edge alignment. Register 72 not only detects the pulse chosen from the train of 8 unique length pulses, but it observes the train itself to distinguish between a train of pulse formed by 56 and 64 clocks leading edge alignment and a train of pulses formed by trailing edge alignment. In this example the chosen pulse was selected to be the sixth of the eight which appear between leading edge phase alignments of the 56 and 64 kHz signals.

The timing control output pulse from NAND-gate 86 appears on path 88 and is a negative pulse having a pulse length of 1.12 microseconds. This timing control pulse is inverted by inverter 90 and applied as one input to the AND-gate 94 via path 92. The other input to AND-gate 94 is the 56 kbps clock that is applied via junction 96, path 98 to inverter 100 and path 102, junction 104 and path 106. The output of AND-gate 94 is applied to the D input of resample 108. Clock timing to flip-flop 108 is applied via the inverted high speed clock 36 via junction 110 and path 112. The Q output of flip-flop 108 is applied via path 114, junction 116 and path 118 to the reset input of counter 120. In this application an octal counter is employed. Timing for the octal counter 120 is obtained from line rate divider 44 via path 60, junction 61, path 62, junction 124 and path 126 through inverter 128 and path 130. The timing pulse output is also applied to the data grouping circuit 30 via path 114. This timing pulse indicates the timing of phase alignment and 8th bit insertion to each word.

The 8th bit insertion is accomplished by the octal counter 120, AND-gate 64, flip-flop 58, flip-flop 136 and multiplexer 152. The timing pulse output from flip-flop 108 may be appropriately designated as the counter reset pulse in this case. Because of the position of the chosen pulse with respect to the 8 unique pulses and its relation to the leading edge alignment of the 64 and 56 kbps clock pulses, the reset pulse appears following the 6th unique pulse as shown at D in FIG. 3. This pulse resets counter 120 which then begins counting again on the trailing edge of the 64 kbps clock pulses. As shown at E in FIG. 3 the octal counter output applied to path 22 rises on the trailing edge of the clock pulse preceeding the alignment condition and will remain such until the next trailing edge of the succeeding clock pulse. Because the counter output is responsive to the trailing edge of the 64 kbps clock, AND-gate 64 will remain enabled to pass the 7th data pulse through flip-flop 58 to one input of multiplexer 152. This is illustrated by the flip-flop 58 clock signal, i.e., output of AND-gate 64 as shown as waveform F in FIG. 3. The octal counter output signal is also applied via path 122, junction 132 to the D input of multiplexer select flip-flop 136, which also receives its clock timing from line rate divider 44 via junction 63 and path 138. When the blanking pulse appears at the output of octal counter 120, multiplexer select flip-flop 136 goes into its set state. This generates an output pulse from the Q output which is applied via junction 146 and path 140 to the supervisory select portion of multiplexer 152 and the supervisory bit generator 148 via the input path 144. Thus the output of bit generator 148 is added to the transmission line via multiplexer 148, and is clocked so that the 8th bit is inserted following the 7 data bits to form the 8 bit word at the 64 kbps line rate.

As noted hereinabove the 8th bit is either a signalling (S), control (U), or framing (F) bit depending on the state of a 12 state counter internal to the supervisory bit generator which is clocked on the falling edge of the multiplexer select pulse (G) at an internal 8 kHz rate. The clock input to data line rate flip-flop 58 is illustrated by waveform F in FIG. 3. The Q output of multiplexer select flip-flop 136 is shown as waveform G in FIG. 3; and the character of two of the supervisory control bits is illustrated in waveform H.

The data from the data grouping circuit 30 along path 32 is illustrated by waveform I of FIG. 3. This 7 bit word can be either lower speed data 2.4, 4.8, 9.6, 19.2 kbps from the data grouping circuit or 56 kbps data directly or 7 bit encoded voice from the telephone interface circuit. This data is retimed at the fixed 56 kbps rate by flip-flop 34 as shown at J in FIG. 3. As shown at K in FIG. 3 the data word is shifted by one bit. This occurs because the blanking output pulse from octal counter 120 interrupts and delays the transmission of the data pulses by one pulse length, i.e. one time slot once every 125 microseconds. This is illustrated by bit 7 which appears in two time slots. Bit 7 could have been read twice absent the blanking of the flip-flop 58. It should be noted, however, that the blanking of flip-flop 58 is not necessary because the multiplexer 152 is shifted from one select position to another, and during the 8th bit time period the multiplexer accepts information only from the supervisory bit generator 148. An example of a part of the serial binary data applied to the line 16 via path 154 is illustrated as waveform L in FIG. 3. Only one full 8 bit word is illustrated in FIG. 3 but it is to be understood that the 8th bit of each byte would be an added bit. As illustrated at waveform G the Q output is normally low, i.e., a binary "0", which means that the $\overline{Q}$ output, applied via path 142, to a second select input of multiplexer 152 is usually a binary "1". This means that the data signal is normally being transmitted via path 154 to transmission line 16 and hence to the telephone central office.

Correct operation is based upon the premise that the 56 kbps and 64 kbps clocks exhibit leading edge phase alignment once every 125 microseconds. But it is possible for the line rate divider 44 and the data rate divider 48 to power up such that the line and data rate clocks produce trailing edge phase alignment. This is because the rate dividers 44 and 48 are not initialized to a specific state when the power is first applied. This would produce a different sequence of phase related pulses from AND-gate 74. This is an undesirable situation because the (2.24 microseconds) chosen pulse will be located at a new location in time unless another of different duration is selected and is precluded as follows. If the trailing edge sequence of pulses are clocked through register 72, the combinational logic of inverter 82, inverter 85, and NAND-gate 87 along with the inverted 56 kbps clock signal from the data rate divider 48 would detect a 1.12 microsecond pulse. It is the only pulse that will appear at the output of NAND-gate 87, and only occurs when the 56 kpbs and 64 kpbs clocks have trailing edge phase alignment. When such a pulse appears at the output of NAND-gate 87 it is fed back via path 89 to the clear input of divider 44 and 48. This clears the two counters and when they are next clocked by the high speed clock 36 they will then exhibit leading edge phase alignment. It should be noted, however, that this reset pulse could equally well have been used as an alternate chosen pulse for the case where line and data rate clocks show alignment on their trailing (falling) edges although this application was not implemented in the preferred embodiment.

Another way of looking at this power up problem is as follows: The D flip-flops (4 each) contained in counters (dividers) 44 and 48 have two legal states: Q=1, $\overline{Q}$=0 and Q=0, $\overline{Q}$1. When power is applied there is no way of guaranteeing which state will dominate at a given power up (without external power reset circuitry). Since the 56 kbps and 64 kbps clocks are derived by counting 896 kHz counter input clock pulses, the counters may power up in any one of 16 possible states and begin counting from a count of 0 to a count of 15. As they start counting the probability is ½ that the outputs of 44 and 48 will observe either leading edge or trailing edge alignment. This has been dealt with by clearing both counters to a count of "0" if they observe trailing edge alignment. It might be noted that in this way if in the process of operating (system up and running) a noise spike or glitch should throw the count of either counter off (return to trailing edge alignment) the system is self-correcting and would immediately return to leading edge alignment by clearing counters to a count of "0".

While the invention has been particularly shown and described with reference to a preferred embodiment thereof, it will be understood by those skilled in the art that change in form and detail may be made therein without departing from the spirit and scope of the invention.

What is claimed is:

1. Digital transmission apparatus adapted to accept binary data from a data source and to convert said data into a serial pulse train formed of words having n bits per byte in n equal-length time slots at a line transmission rate L, and wherein said binary data has a bit rate M which is less than said line transmission rate L, said apparatus comprising:

timing means generating a first clock signal of bit rate L and a second clock signal of bit rate M;

synchronizing means, responsive to said second clock signal and to said binary data, providing a synchronized binary data signal in phase with said second clock signal of bit rate M;

retiming means, responsive to said first clock signal and to said synchronized binary data signal, providing a retimed binary data signal of bit rate M;

comparison means, responsive to said first and second clock signals, providing a coincidence output signal when said first and second clock signals are in phase alignment; and multiplexing means for increasing the bit rate of said retimed binary data signal from M to L and for inserting additional bits into said retimed binary data signal at appropriate time slots in response to said coincidence output signal, and thereby providing a serial pulse train at the desired line transmission rate L.

2. Apparatus as in claim 1 wherein said bit rate L=64 kbps and said bit rate M=56 kbps.

3. Apparatus as in claim 1 wherein said timing means further comprises:

clock means having a clock output signal with a repetition rate an integral multiple of L and M;

first means responsive to said clock output signal for deriving said first clock signal of bit rate L; and second means responsive to said clock output signal for deriving said second clock signal of bit rate L.

4. Apparatus as in claim 3 wherein said comparison means determines phase alignment when the leading edges of individual pulses of said first and second clock signals are coincident.

5. Apparatus as set forth in claim 4 wherein said first means comprises a first divider for deriving said first clock signal, and said second means comprises a second divider for deriving said second clock signal, each said divider having a reset input.

6. Apparatus as set forth in claim 5 wherein said comparison means further comprises:

reset means responsive to said binary pulse output signals to provide a reset pulse to the reset input of said first and second dividers upon the occurrence of coincidence of trailing edge alignment of said first and second clock pulses, whereby the alignment on an unwanted phase condition is prohibited.

* * * * *